United States Patent [19]
Burgdorf et al.

[11] 3,887,044
[45] June 3, 1975

[54] SPOT-TYPE DISC BRAKE

[75] Inventors: Jochen Burgdorf, Offenbach; Dieter Eikenberg, Frankfurt-Rodelheim, both of Germany

[73] Assignee: ITT Industries, Inc., New York, N.Y.

[22] Filed: Mar. 11, 1974

[21] Appl. No.: 450,034

[30] Foreign Application Priority Data
Mar. 20, 1973 Germany............................ 2313693

[52] U.S. Cl. ........... 188/73.5; 188/72.4; 188/250 G
[51] Int. Cl. .......................................... F16d 69/04
[58] Field of Search ........ 188/73.3, 73.5, 73.6, 234, 188/250 G, 72.4, 72.5

[56] References Cited
UNITED STATES PATENTS

| | | | |
|---|---|---|---|
| 1,624,035 | 4/1927 | Bowman | 188/250 G |
| 3,322,236 | 5/1967 | Burnett | 188/73.5 |
| 3,387,687 | 6/1968 | Eggstein et al. | 188/73.3 |
| 3,705,641 | 12/1972 | Brooks et al. | 188/73.3 |
| 3,788,429 | 1/1974 | Brooks et al. | 188/73.5 |

FOREIGN PATENTS OR APPLICATIONS

| | | | |
|---|---|---|---|
| 1,154,701 | 6/1969 | United Kingdom | 188/73.6 |
| 1,202,075 | 9/1965 | Germany | 188/73.6 |

*Primary Examiner*—Trygve M. Blix
*Assistant Examiner*—Edward R. Kazenske
*Attorney, Agent, or Firm*—John T. O'Halloran; Menotti J. Lombardi, Jr.; Alfred C. Hill

[57] ABSTRACT

There is disclosed a brake shoe support for a spot-type disc brake having a caliper embracing the brake disc from which the brake shoes are supported. The brake shoe support herein includes a bolt engaging the middle zone of the brake shoe. The bolt includes a radial groove into which is placed a ring of elastic material having an outer diameter sufficient to engage an axial bore in the actuating device supported from one end of the caliper. The brake shoe supported from the other end of the caliper includes a bolt engaging in the middle zone of the brake shoe remote from the actuation device. This latter bolt also has a radial groove which receives a retaining spring attached to the caliper.

8 Claims, 2 Drawing Figures

SPOT-TYPE DISC BRAKE

BACKGROUND OF THE INVENTION

This invention relates to a spot-type disc brake having an actuation device in a housing and a caliper embracing the brake disc. During the actuation process a brake shoe connected to the actuation device and being supported separately is pressed against the brake disc and by the force of reaction acting upon the housing the brake shoe remote form the actuation device connected to and supported by the caliper is pressed against the brake disc.

From the British Patent 1,154,701 a spot-type disc brake is known, which has an actuation device in a housing which is provided with a caliper embracing the brake disc and in which brake the support of the brake shoes is provided by means of supporting bolts. The brake shoe connected to the caliper remote from the actuation device has a brake pad carrier plate with a bore. This bore is arranged on a supporting bolt which is fixed in the caliper. The brake shoe adjacent the actuation device also is provided with a bore in the brake pad carrier plate. This latter bore is arranged on a supporting bolt projecting out of the actuation device. The support of the brake forces, which is performed on the side of the actuation device by the brake bracket, is performed on the end of the caliper remote from the actuating device by the supporting bolt which is thereby very heavily loaded. The vibrations and shocks occurring during the braking process are at the brake shoe adjacent the actuation device directly transmitted via the supporting bolt to the actuation device. This can lead to spanning and jamming which, on the one hand, results in damage to the actuation device and, on the other hand, prevents an efficient force transmission from the actuation device to the brake shoe.

It is another disadvantage of this prior art arrangement that the brake shoes may corrode tightly onto the supporting bolt so that a replacement of the brake shoes is no longer possible.

SUMMARY OF THE INVENTION

It is the object of this invention to provide a spot-type disc brake having a support for the brake shoe adjacent the brake actuation device that will absorb the shocks and vibrations occurring during the braking process.

A feature of the present invention is the provision of an arrangement to support the brake shoes of a spot-type disc brake comprising: a housing; a caliper connected to the housing and embracing a brake disc; a brake actuation device disposed in the housing; a first brake shoe associated with the actuation device; a second brake shoe associated with the caliper remote from the actuation device; a first supporting bolt secured to the middle zone of the first brake shoe; a ring of elastic material disposed on an end of the first bolt adjacent the actuation device; and a bore in the actuation device to receive the bolt and the ring of elastic material, the bolt being supported by the ring of elastic material under prestress in the bore.

It is an advantageous embodiment to provide the supporting bolt at the end thereof adjacent the actuation device with a radial groove in which the ring of elastic material is arranged, the ring of elastic material having a larger outside diameter than the supporting bolt. For venting the bore in the actuation device when mounting the brake shoe, it is advantageous to provide the supporting bolt with a channel, which connects the zone in front of the radial groove in the pad carrier with the zone not disposed in the pad carrier behind the radial groove.

According to this invention the supporting bolt of the brake shoe remote from the actuation device can be formed the same as the supporting bolt adjacent the actuation device. The supporting bolt remote from the actuation device can be latched with its radial groove into an opening of a retaining spring connected to the caliper. According to an advantageous embodiment the retaining spring may have in its center a first bore for receiving the supporting bolt, whose diameter approximately corresponds to the diameter of the supporting bolt at its radial groove. The retaining spring may also have a second larger bore of larger diameter than the supporting bolt. The second bore is in an overlapping relationship with the first bore in such a way that the retaining spring can be shifted and the supporting pin, which is entered into the second bore of the retaining spring, locks with the zone of its radial groove into the first bore.

By the elastic support of the brake shoe adjacent the actuation device the vibrations and shocks occurring when braking are absorbed and are not transmitted to the actuation device. Thus, a spanning and jamming is prevented and also damage to the actuation device is prevented. The identical form of the supporting bolts for the two brake shoes allows for an ecomonical manufacture of these supporting bolts.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
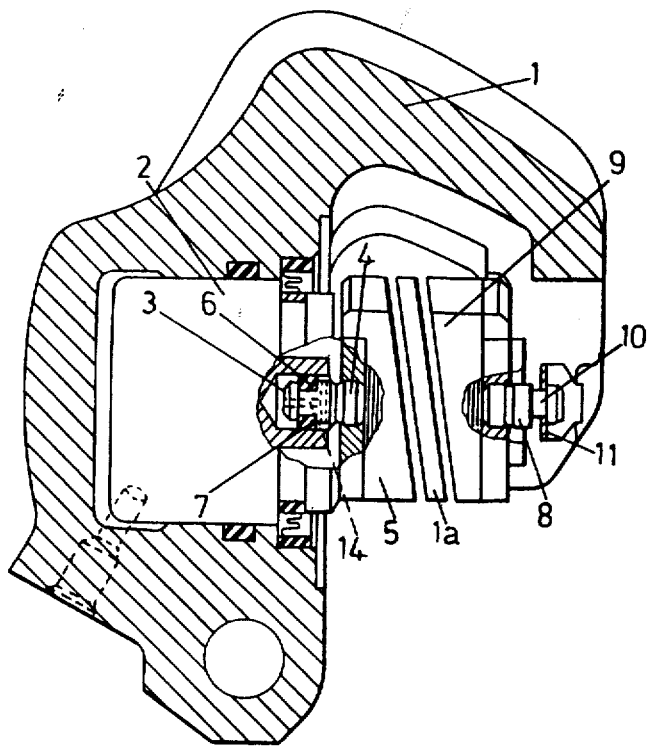
FIG. 1 is a cross sectional view partially in elevation of a spot-type disc brake in accordance with the principles of the present invention.
Figure 2:
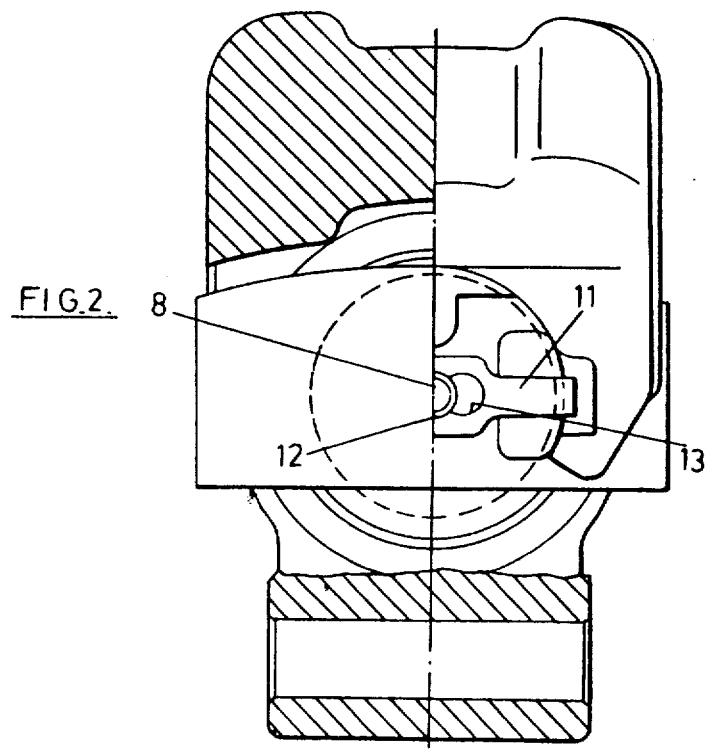
FIG. 2 is a cross sectional view partially in elevation of the spot-type disc brake of FIG. 1 seen from the caliper.

Referring to FIGS. 1 and 2, actuation device 2 is disposed in the housing of a spot-type disc brake including a caliper 1 embracing the brake disc 1a. Actuation device 2 is provided with a central bore 3 to receive a supporting bolt 4 in a gripping relation. Bolt 4 is secured in a brake shoe 5. The supporting bolt 4 is provided with a radial groove 6, in which is seated a ring 7 of elastic material, which holds brake shoe 5 with its supporting bolt 4 under prestress in bore 3. The supporting bolt 8 of the brake shoe 9 has the same form as supporting bolt 4 and is locked with its radial groove 10 into a retaining spring 11 which is secured to caliper 1. Retaining spring 11 has a central bore 12 and a larger diameter bore 13 overlapping central bore 12. The diameter of central bore 12 approximately corresponds to the diameter of supporting bolt 8 in the zone of radial groove 10. These two bores 12 and 13 are arranged at such a distance from each other that supporting bolt 8 can be entered into larger diameter bore 13 and when the retaining spring 11 is shifted central bore 12 is locked in radial groove 10.

In order to easily mount brake shoe 5, supporting bolt 4 is provided with a channel 14 to exhaust the air out of bore 3.

While we have described above the principles of our invention in connection with specific apparatus it is to be clearly understood that this description is made only by way of example and not as a limitation to the scope of our invention as set forth in the objects thereof and in the accompanying claims.

We claim:

1. An arrangement to support the brake shoes of a spot-type disc brake comprising:
   a housing;
   a caliper connected to said housing and embracing a brake disc;
   a brake actuation device disposed in said housing;
   a first brake shoe associated with said actuation device;
   a second brake shoe associated with said caliper remote from said actuation device;
   a first supporting bolt secured to the middle zone of said first brake shoe having a given outer diameter;
   a ring of elastic material disposed on an end of said first bolt adjacent said actuation device, said ring of elastic material having an outer diameter greater than said given outer diameter; and
   a bore in said actuation device to receive said first bolt and said ring of elastic material, said first bolt being supported by said ring of elastic material under prestress in said bore.

2. An arrangement according to claim 1, wherein adjacent an end of said first bolt adjacent said actuation device there is disposed a radial groove.

3. An arrangement according to claim 2, wherein said ring of elastic material is disposed in said radial groove of said first bolt, said ring of elastic material having a diameter slightly greater than the diameter of said bore.

4. An arrangement according to claim 3, wherein said first bolt includes a channel internally thereof to vent said bore when said first bolt and said ring of plastic material are inserted in said bore.

5. An arrangement according to claim 4, further including
   a second supporting bolt secured to the middle zone of said second brake shoe, said second bolt securing said second brake shoe to said caliper.

6. An arrangement according to claim 5, wherein said second bolt includes a radial groove therein adjacent said caliper, said second bolt and said first bolt having an identical configuration.

7. An arrangement according to claim 6, further including
   a retaining spring secured to said caliper, said spring having an opening therein to engage said radial groove of said second bolt to secure said second brake shoe to said caliper.

8. An arrangement according to claim 7, wherein said retaining spring includes:
   a first bore disposed centrally of said spring to receive said radial groove of said second bolt, the diameter of said first bore being approximately equal to the diameter of said second bolt at said radial groove, and
   a second bore disposed in an overlapping relationship with said first bore such that said second bore can receive said second bolt and upon shifting said retaining spring said radial groove of said second bolt locks into said first bore.

* * * * *